(12) United States Patent
Vance

(10) Patent No.: US 6,321,490 B1
(45) Date of Patent: *Nov. 27, 2001

(54) MECHANICALLY INTERLOCKED WEATHERSTRIP

(75) Inventor: James Randall Vance, Roanoke, IN (US)

(73) Assignee: GenCorp Inc., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/941,935

(22) Filed: Oct. 1, 1997

(51) Int. Cl.[7] .................................................. B60J 1/10
(52) U.S. Cl. ................................................. 49/377; 49/440
(58) Field of Search ........................... 49/377, 502, 440, 49/441, 490.1, 495.1

(56) References Cited

U.S. PATENT DOCUMENTS

| | | | |
|---|---|---|---|
| 2,568,811 | * 9/1951 | Larsen | 49/490.1 |
| 3,197,935 | 8/1965 | Clancy et al. | 52/718 |
| 3,638,359 | 2/1972 | Kruschwitz | 49/490 |
| 3,665,646 | * 5/1972 | Niemanns | 49/495.1 |
| 3,742,694 | 7/1973 | Duchnahl | 49/441 |
| 4,750,781 | 6/1988 | Betteridge | 296/214 |
| 4,843,763 | * 7/1989 | Mesnel et al. | 49/440 |
| 4,949,507 | * 8/1990 | Vaughan | 49/482 |
| 4,970,828 | * 11/1990 | Mesnel et al. | 49/440 |
| 4,989,315 | * 2/1991 | Mesnel et al. | 49/490.1 |
| 5,004,292 | * 4/1991 | Horne | 296/153 |
| 5,010,689 | * 4/1991 | Vaughan | 49/440 |
| 5,040,333 | * 8/1991 | Mesnel et al. | 49/374 |
| 5,085,005 | 2/1992 | Yasukawa et al. | 49/377 |
| 5,086,589 | 2/1992 | Dibenedetto | 49/502 |
| 5,136,773 | * 8/1992 | Mesnel et al. | 29/527.4 |
| 5,174,066 | 12/1992 | Dupuy | 49/502 |
| 5,199,760 | * 4/1993 | Vering | 296/146 |
| 5,207,027 | * 5/1993 | Larsen | 49/482 |
| 5,267,415 | * 12/1993 | Vaughan | 49/377 |
| 5,353,549 | * 10/1994 | Henderson et al. | 49/490.1 |
| 5,363,537 | * 11/1994 | Schneider et al. | 24/289 |
| 5,396,733 | 3/1995 | Dupuy | 49/441 |
| 5,433,038 | * 7/1995 | Dupuy | 49/377 |
| 5,493,815 | * 2/1996 | Belser et al. | 49/490.1 |
| 5,544,448 | * 8/1996 | Mass | 49/377 |
| 5,561,003 | 10/1996 | Nowosiadly | 428/99 |
| 5,775,030 | * 7/1998 | Hamabata | 49/377 |
| 5,913,762 | * 6/1999 | Matsumoto | 49/377 |
| 6,070,363 | * 6/2000 | Vance | 49/377 |
| 6,128,859 | * 10/2000 | Vance | 49/377 |

FOREIGN PATENT DOCUMENTS 0 507 231 A2   10/1992   (DE) .

* cited by examiner

Primary Examiner—Daniel P. Stodola
Assistant Examiner—Curtis A. Cohen
(74) Attorney, Agent, or Firm—Brinks Hofer Gilson & Lione

(57) ABSTRACT

A mechanically interlocking belt weatherstrip for a motor vehicle. The weatherstrip is formed by three separate components: a cover, a body and a sealing lip. The weatherstrip may be made from separate, all-extruded components, or may be a made from a combination of molded and extruded components. The weatherstrip is formed by snapping the body and the cover snap together to hold the sealing lip securely in place. Because the cover can be easily interchanged with a different cover, the cover can be made to include properties, such as color and gloss, desired by a particular motor vehicle manufacturer while the remaining components remain unchanged. Thus, the weatherstrip allows versatility of the selection of the separate components to meet the individual style and functional needs of a particular motor vehicle design.

16 Claims, 5 Drawing Sheets

MECHANICALLY INTERLOCKED WEATHERSTRIP

BACKGROUND OF THE INVENTION

1. Field of the Invention

The invention relates generally to weatherstrips for motor vehicles and more specifically to a mechanically interlocked weatherstrip for window frames of a motor vehicle.

2. Related Art

Most motor vehicles are equipped with movable windows that slide in a window opening from an up or extended position that seals off the opening to a down position, retracted within the vehicle body, that opens all or a portion of the opening and allows an exchange of air between the inside and outside of the vehicle. A sealing device broadly referred to as a weatherstrip is disposed about the periphery of the window opening and provides an air and watertight seal between the vehicle body and the window. The interface between the body and the movable window at the lower extremity of the window opening is typically equipped with a weatherstrip denominated a beltstrip which aesthetically hides the interface and provides a wiper flange or blade for cleaning the window as the window extends and retracts from the body of the vehicle.

Recently, emphasis has been placed upon vehicle streamlining for drag reduction purposes and reduction of wind noise. To achieve these goals, design considerations such as the elimination of all gaps and channels, low profile configurations, overlapping of the beltstrip or weatherstrip on the glass for wind noise reduction, as well as installation ease, serviceability and durability have greatly increased significance. The challenge of achieving such goals depends upon the proper execution of such design considerations.

Beltstrips and weatherstrips are generally extruded or roll-formed in a complicated manufacturing process having many steps. Typically, a core metal structure is formed and coated with an extruded layer of synthetic elastomeric material to form a belt molding and then is then cut to length. A sealing strip having a flexible blade for contacting the window may be formed and coated in an extrusion process with rubber or similar material to form a base strip. An inner surface of the blade is generally flocked to provide a low friction coating for reducing friction between the blade and the window and to reduce the tendency of the weatherstrip and window to squeak. The sealing strip is usually affixed to the belt molding. The belt molding and the base portion of the sealing strip are usually notched at spaced locations. Clips are then inserted into the notches to affix the belt molding, sealing strip and clips. The clips also grip a flange edge formed on the door of the vehicle to hold the belt weatherstrip to the door of the vehicle.

The materials used to form the belt weatherstrip are typically a combination of thermoset elastomer or thermoplastic and thermoplastic elastomer. For example, an elastomer may be over extruded on a metal carrier and then a post assembled laminate strip of cosmetic film and metal that is roll formed into a C-configuration is mechanically fastened over a section of the front surface of the belt weatherstrip.

The requirement of cosmetic surfaces dictates that the surface area be made of specific thermoplastic, a decorative film, or consist of a painted metal while providing a seal to prevent air and water leakage. Conventional weatherstrips lack the flexibility to interchange the front surface in order to provide a different cosmetic appearance.

SUMMARY OF THE INVENTION

It is an object of the invention to provide a mechanically interlocking weatherstrip assembled from distinctly separate components.

It is another object of the invention to provide a belt weatherstrip made by interlocking two separately molded thermoplastic parts and a functional elastomeric part.

To achieve these and other objects of the invention, the weatherstrip comprises a cover, an body and a sealing lip that mechanically interlock with each other to form the weatherstrip.

The cover can be made of a suitable thermoplastic material and may include properties, such as color and gloss, designed for a particular motor vehicle manufacturer while the remaining components remain unchanged. This feature provides versatility of the selection of the separate components to meet the individual style and functional needs of a particular motor vehicle design. In addition, the weatherstrip may be made from separate, all-extruded components, or may be a made from a combination of molded and extruded components.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

Figure 1:
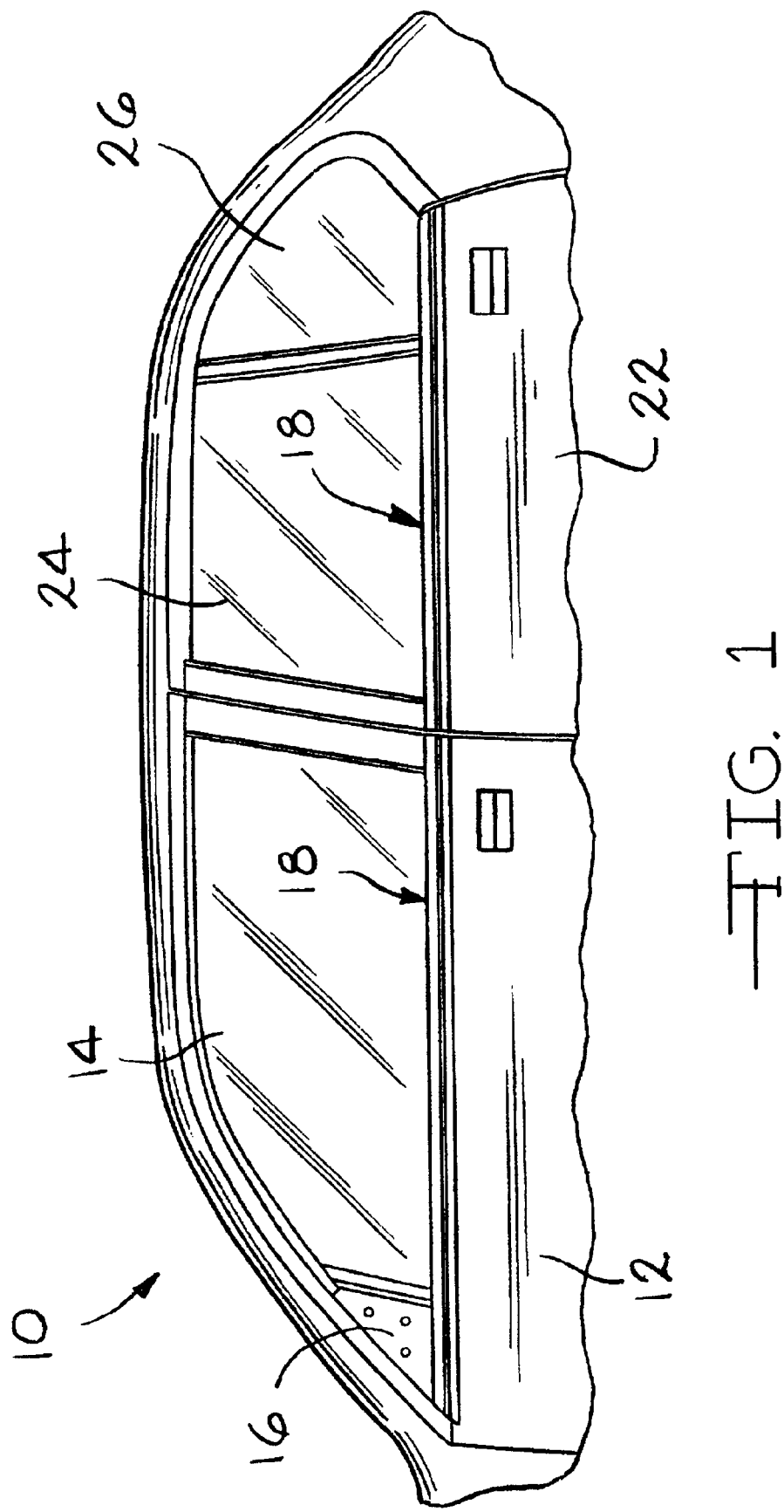
FIG. 1 shows a partial side elevation of a motor vehicle.

With reference to the drawings, FIG. 1 shows a partial side elevation of a four-door motor vehicle 10 having a front door 12 and a rear door 22, a movable front window 14 and a movable rear window 24, a mirror patch 16, a fixed window 26, and a beltstrip or weather strip 18 attached to the front door 12 at an interface between the front window 14 and the front door 12.

Similarly, the weatherstrip 18 may be attached to the rear door 22 at an interface between the rear window 24 and rear door 22. The weatherstrip 18 extends longitudinally along both the lower edge of the front window 14 and the lower edge of the rear window 24 and operates to aesthetically conceal the interface between the front door 12 and the front window 14 and the rear door 22 and the rear window 24, as well as to provide a seal for air and water leakage therebetween.

Figure 2:
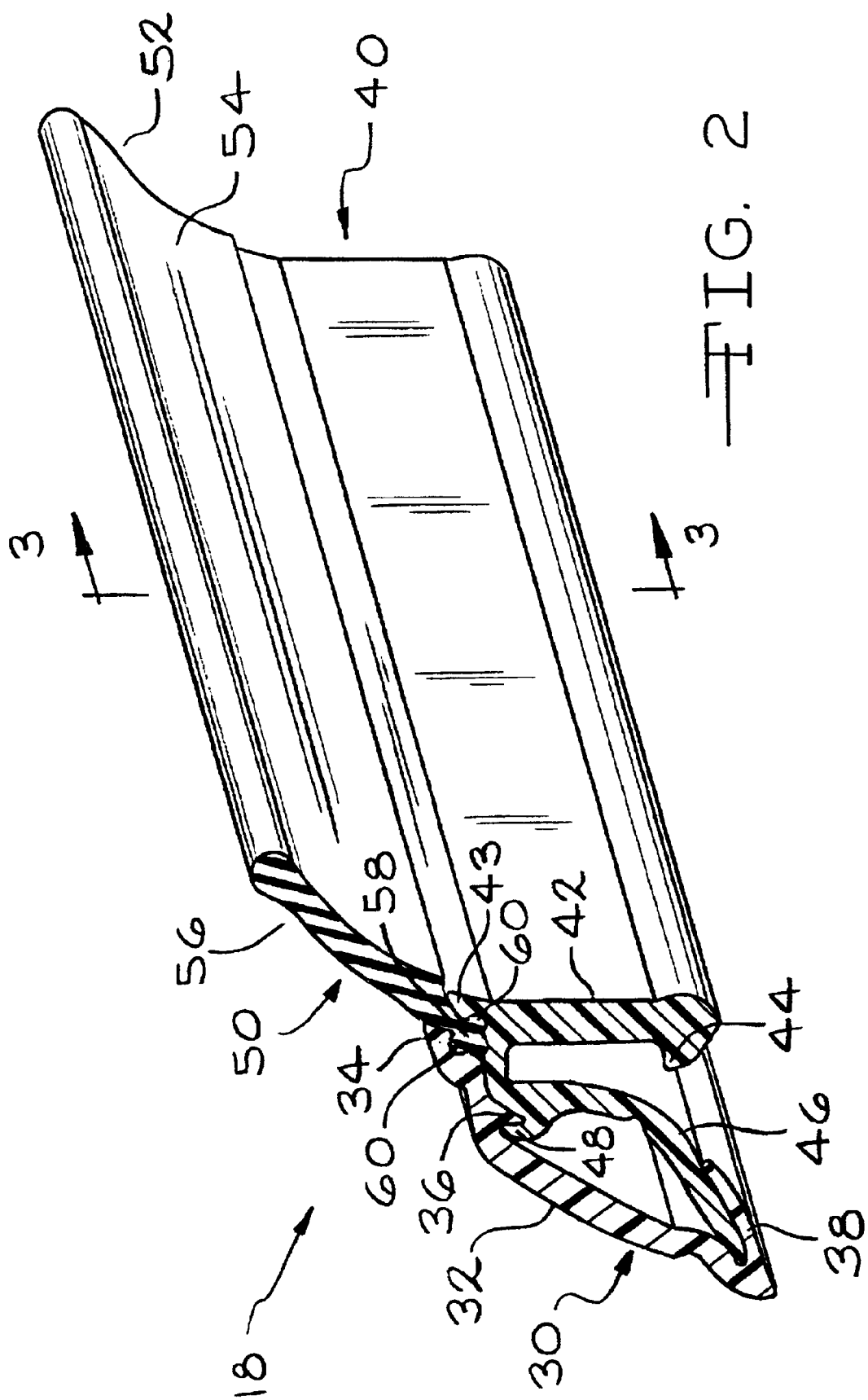
FIG. 2 shows a partial perspective view of a weatherstrip according to a preferred embodiment of the invention.
Figure 3:
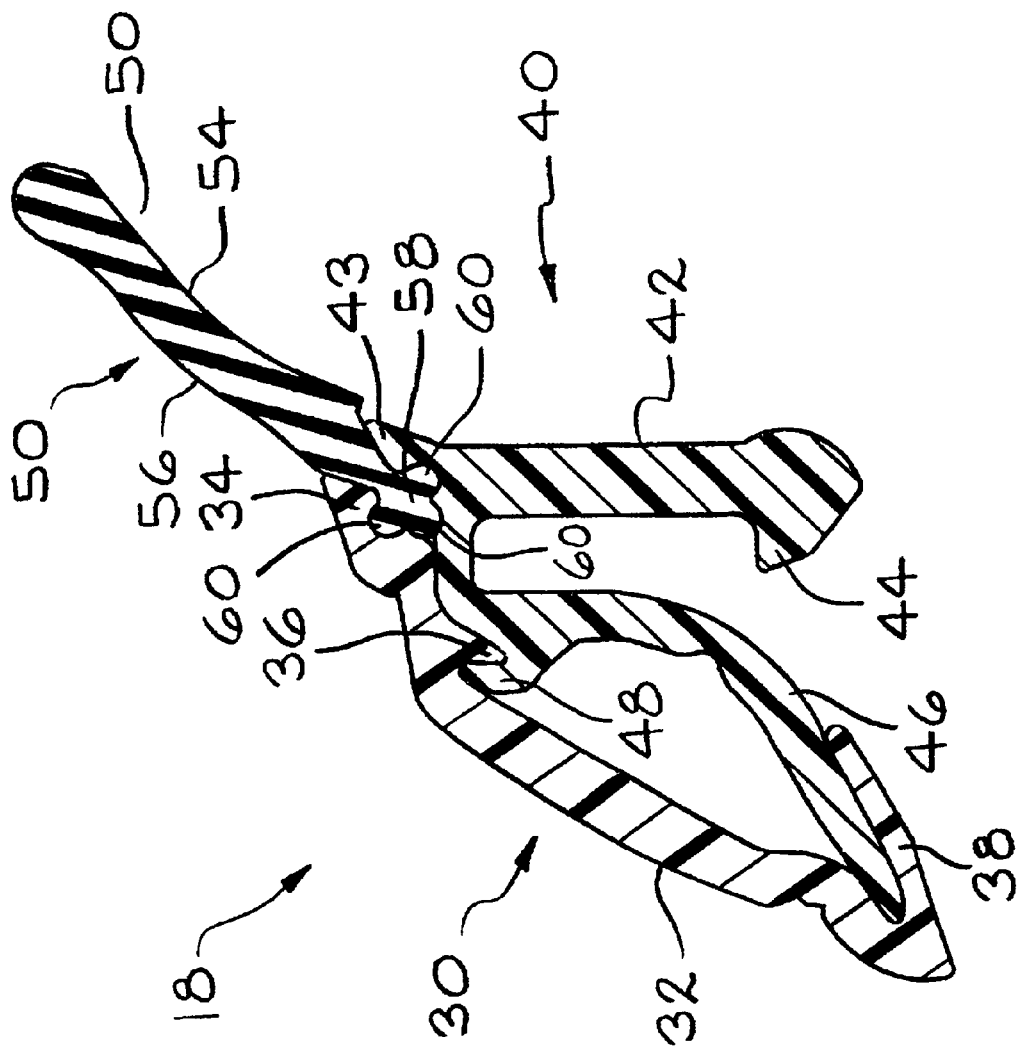
FIG. 3 shows a cross-sectional view of a weatherstrip according to the preferred embodiment of the invention taken along lines 3—3 of FIG. 2.
Figure 4:
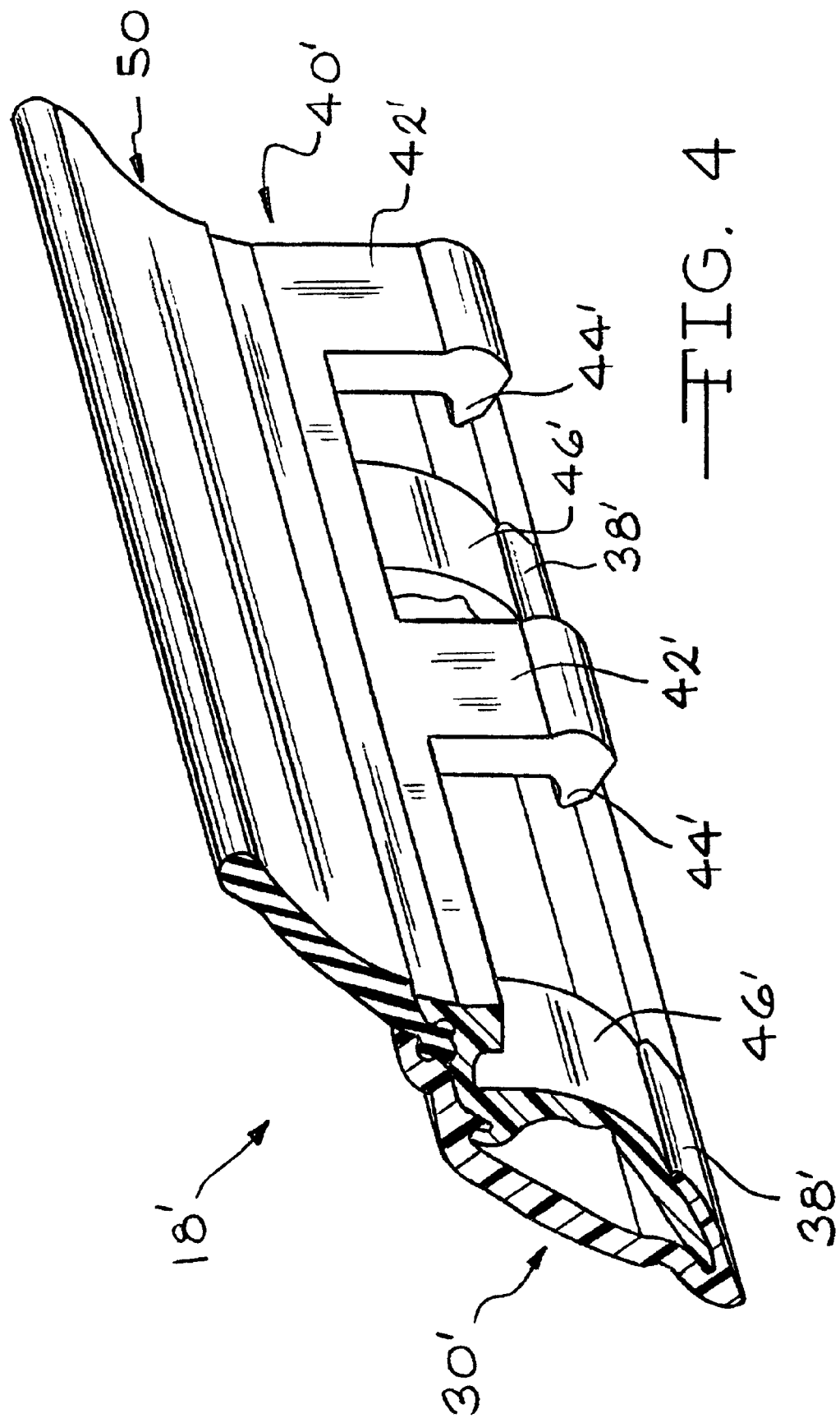
FIG. 4 shows a partial perspective view of a weatherstrip according to another preferred embodiment of the invention.

The weatherstrip 18 of the invention is shown in FIGS. 2 through 4. The weatherstrip 18 preferably comprises three separate components: a cover 30, a body 40 and a sealing lip 50.

The cover 30 includes a side wall 32, an upper camming projection 34, a struck out portion 36, and a transition portion 38.

The cover 30 serves as an outer decorative component made from material to meet color, gloss and weatherability requirements of the individual motor vehicle manufacturer. The cover 30 may be made of a wide variety of materials and may be molded or extruded using a process well-known in the art.

In the preferred embodiment, the cover 30 is made preferably of a colored, weatherable grade, acrylic-styrene-acrylonitrile polycarbonate (ASA/PC) alloy. However, the cover 30 may also be made of combinations of nylon alloy materials, such as ASA, thermoplastic (TPO), polyvinyl chloride (PVC) and the like. Also, the cover 30 may be made of a film laminated thermoplastic material, such as acrylonitrile-butadiene-styrene (ABS), polyethylene teraphthalate (PET) and polybutylene teraphthalate (PBT) and the like. In addition, the cover 30 may be made of body matched painted thermoplastic material from any variety of thermoplastic families based on ABS, PET, PBT, polyamide (nylon) (PA) and the like.

The body 40 includes a projecting portion 42 having an upper camming projection 43 and a lower camming projection 44 and a lip portion 46 having an upper camming projection 48. In the preferred embodiment, lip portion 46 is located at spaced apart locations to align with a transition portion 38 of the cover 30.

In one embodiment of FIGS. 2 and 3, the projecting portion 42 of the body 40 is formed to continuously extend longitudinally along the front window 14 or the rear window 24 of the vehicle 10.

The body 40 may be made from any inherently dimensionally stable thermoplastic material to meet dimensional stability and exterior motor vehicle requirements. In the preferred embodiment, the body 40 is made from material substantially identical to the cover 30 and may be molded or extruded. However, the body 40 may also be made from PA material, glass filled PA, and the like.

The sealing strip or lip 50 includes a blade portion 52 having a low-friction, inner sealing surface 54 and an outer surface 56 and a lower interlocking portion 58. The inner surface 54 is preferably made of a low-friction material, such as polyester flock, a low-friction coating, a low-friction film and the like. The outer surface 56 may be coated with coating or film or may be uncoated depending on design specifications.

The sealing lip 50 is preferably made of a flexible, elastomeric material, such as rubber, ethylene-propylene-diene-monomer (EPDM), Santoprene® thermoplastic elastomer (TPE) and the like. Santoprene® is a registered trademark of Advanced Elastomer Systems, L. P. of Akron, Ohio. The sealing lip 50 may be molded or extruded using a process well-known in the art.

When the weatherstrip 18 is installed on a vehicle 10, the sealing lip 50 functions as a wiper so that when the front window 14 or the rear window 24 is raised, any moisture or other residue on the window will be wiped away. The sealing lip 50 also prevents the leakage of moisture or other residue into the door panel and reduces the amount of noise transferred to the interior of the vehicle 10.

The lower interlocking portion 58 defines a plurality, preferably three, generally semi-circular projections or ribs 60 preferably oriented at right angles to one another and generally to the blade portion 52 of the sealing strip 50. Thus, the lower interlocking portion 58 in this embodiment generally has a cloverleaf-shaped cross section. The semi-circular projections 60 fit into recesses formed in the cover 30, the body 40 and a recess formed by both the cover 30 and the body 40. To mechanically interlock the above-mentioned separate components to form the weatherstrip 18, the lower interlocking portion 58 of the sealing lip 50 is positioned to abut the camming projection 34 of the cover 30 as shown in FIG. 3. The lip portion 46 of the body 40 is urged toward the transition portion 38 until the lip portion 46 encounters the transition portion 38. The camming projection 48 of the body 40 is urged toward the struck out portion 36 of the cover 30. The inherent resiliency of the lip portion 46 of the body 40 abutting against the transition portion 38 of the cover 30 urges the camming projection 48 upward and inward towards the struck out portion 36. As the camming projection 48 is biased towards the cover 30, an audible sound like a "click" is emitted, indicating that the body 40 is properly snapped in place. When properly snapped in place, the upper camming projection 43 of the body 40 is biased towards the camming projection 34 of the cover 30 to securely hold the sealing lip 50 in place and to mechanically interlock the weatherstrip or beltstrip 18.

Alternatively, the cover 30 and the body 40 may first be properly snapped in place. Then, the interlocking portion 58 may be slid longitudinally in the channel formed between the camming projection 34 of the cover 30 and the upper camming projection 43 of the body 40 to form the mechanically interlocked weatherstrip or beltstrip 18.

To securely affix the weatherstrip 18 to the vehicle 10, the lower camming projection 44 of the mechanically interlocking weatherstrip 18 may then be used to engage a portion of the front door 12 and the rear door 22, for example, the pinch weld (not shown) in a manner well-known in the art. It should be appreciated that the weatherstrip 18 may be attached to any piece of material that has a surface or edge that can be gripped by the lower camming projection 44.

It should be appreciated that the invention is not limited to the particular geometric configuration or shape of the body 40 and, in particular the projection portion 42 and the lower camming projection 44. It is envisioned that the body 40 can be adapted to a variety of cross-sectional shapes so that the weatherstrip 18 can accommodate and be installed in a wide variety of door configurations. It is also envisioned that the body 40 may also include a steel reinforcing member to provide rigidity to the body 40 by extruding EPDM material over a steel carrier using a process well-known in the art.

FIG. 4 shows an alternate embodiment of the weatherstrip or beltstrip 18'. In the alternate embodiment of the invention, the sealing lip 50 is substantially identical to the embodiment shown in FIGS. 2 and 3. However, the cover 30' shown in FIG. 4 includes a plurality of transition portions 38' that are located at spaced intervals in the longitudinal direction of the weatherstrip 18', rather than a single, continuous transition portion 38 shown in FIGS. 2 and 3. Otherwise, the cover 30' is substantially identical to the cover 30.

Likewise, the body 40' shown in FIG. 4 includes a plurality of projecting portions 42' and lower camming projections 44' are located at spaced apart locations along the longitudinal direction of weatherstrip 18', rather than a single, continuous projecting portion 42 and lower camming projection 44. Otherwise, the body 40' is substantially identical to the body 40.

As readily apparent from FIG. 4, each transition portion 38' of the cover 30' aligns vertically with each projection portion 46' of the body 40' along the length of the weatherstrip 18. It should be appreciated that the weatherstrip 18' contains a sufficient number of projecting portions 42' and lower camming projections 44' to properly attach the weatherstrip 18' to the vehicle 10 in a manner similar to the weatherstrip 18. The cover 30', the body 40' and the sealing lip 50 may be assembled in the same manner as the cover 30, the body 40 and the sealing lip 50 of the weatherstrip 18 as described above to form the mechanically interlocked weatherstrip 18'.

Figure 5:
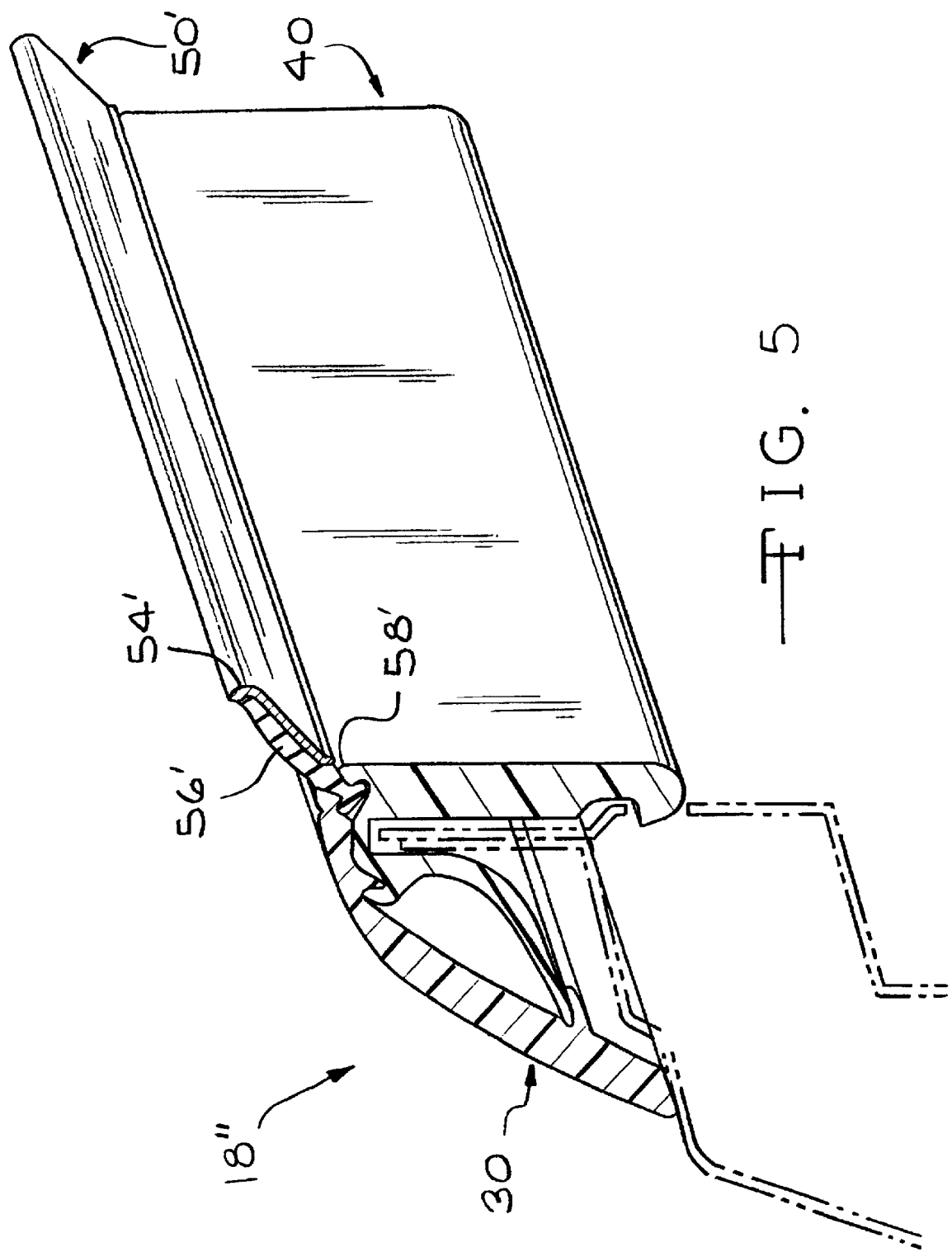
FIG. 5 shows a second alternative embodiment of the invention.

FIG. 5 shows a second alternate embodiment of the weatherstrip or beltstrip 18". In this alternate embodiment, the cover 30 and the body 40 are substantially identical to weatherstrip 18 of FIGS. 1 through 3. However, the sealing lip 50 with the lower interlocking portion 58 having a clover-leaf cross-sectional shape is replaced with a sealing lip 50' with a lower interlocking portion 58' having an elongate cross-sectional shape. The sealing lip 50' also includes an outer surface 56' and an inner surface 58' with a flock-like coating similar to the other embodiments of the invention. The cover 30, the body 40 and the sealing lip 50' may be assembled in the same manner as the cover 30, the body 40 and the sealing lip 50 of the weatherstrip 18 as described above to form the mechanically interlocked weatherstrip 18".

It should be readily apparent that the cover 30 and the body 40 of the weatherstrip 18" may be replaced with the cover 30' and the body 40' of the weatherstrip 18'. It should also be readily apparent that the weatherstrip 18" can be attached to the vehicle 10 in a manner similar to the other embodiments of the invention.

In view of the foregoing, the invention allows versatility of the selection of the separate components to meet the individual style and functional needs of a particular motor vehicle design. In addition, the invention may be made from separate, all-extruded components, or may be a made from a combination of molded and extruded components to provide the most cost-effective method of manufacturing.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. A mechanically interlocked weatherstrip for a motor vehicle, comprising:
   a body having a projecting portion defining a lower camming projection, a first camming projection and a lip portion;
   a cover having a sidewall, a transition portion adapted to receive said lip portion and a second camming projection; and
   a sealing lip having a blade portion and an interlocking portion engaged by said first and second camming projections,
   wherein said cover, said body and said sealing lip are separate components that mechanically interlock with each other to form said weatherstrip.

2. The weatherstrip of claim 1, wherein said cover and said body are made of thermoplastic material.

3. The weatherstrip of claim 1, wherein said sealing lip is made of elastomeric material.

4. The weatherstrip of claim 1, wherein said cover also includes a struck out portion.

5. The weatherstrip of claim 4, wherein said lip portion includes a camming projection engaging said struck out portion of said body.

6. The weatherstrip of claim 1, wherein said weatherstrip is formed by snapping said cover and said body together while said sealing lip engages said cover and said body.

7. The weatherstrip of claim 6, wherein said cover and said body are snapped together by positioning a lip portion of said body adjacent a transition portion of said cover and urging said body towards said cover and causing a camming projection of the lip portion to be positioned adjacent a struck out portion of said cover.

8. The weatherstrip of claim 6, wherein said sealing lip engages a camming projection of said cover and an upper camming projection of said body when said cover and said body are snapped together.

9. A belt weatherstrip for a motor vehicle, comprising:
   a cover including a first camming projection and a struck out portion;
   a body including a second camming projection opposed and spaced from said first camming projection, a projecting portion having a lower camming projection and an upper camming projection engaging said struck out portion; and
   a sealing lip including a lower interlocking portion engaged by said first and second camming projections,
   wherein said second camming projection of said body and said first camming projection of said cover mechanically interacts with said lower interlocking portion of said sealing lip to form said belt weatherstrip.

10. The weatherstrip of claim 9, wherein said cover further includes a transition portion and a side wall.

11. The weatherstrip of claim 10, wherein said body further includes a lip portion with an upper camming projection.

12. The weatherstrip of claim 11, wherein the lip portion of said body and the transition portion of said cover mechanically interact, and wherein the upper camming projection of the lip portion of said body to mechanically interact with the struck out portion of said cover to snap said cover and said body together, causing the upper camming projection of said body and the camming projection of said cover to mechanically interact with the lower interlocking portion of said sealing lip to form said belt weatherstrip.

13. The weatherstrip of claim 9, wherein said cover and said body are made of thermoplastic material and said sealing lip is made of elastomeric material.

14. The weatherstrip of claim 9, wherein said body further includes a lower camming projection.

15. A method of forming a weatherstrip by the mechanical interaction of separate components including a cover having a transition portion, a side wall, a struck out portion and an upper camming projection, a body having a lip portion with an upper camming projection and a projecting portion having an upper and lower camming projection, and a sealing lip having a lower interlocking portion and a blade portion, said method comprising the steps of:
   (a) positioning the lower interlocking portion of said sealing lip adjacent the upper camming projection of said cover;
   (b) positioning said cover and said body such that the lip portion of said body engages the transition portion of said cover and such that the upper camming projection of the lip portion of said body engages the struck out portion of said cover;
   (c) biasing said body towards said cover causing said body and said cover to snap together,
   whereby said body, said cover and said sealing lip mechanically interlock to form a weatherstrip.

16. The method of claim 15, wherein step (a) is deleted and following step (c) the following step is added:
   (d) inserting said sealing lip into a channel formed by the upper camming projection of said cover and the upper camming projection of the projecting portion of said body to form a mechanically interlocked weatherstrip.

* * * * *